US010748565B1

(12) United States Patent
Nakayama et al.

(10) Patent No.: US 10,748,565 B1
(45) Date of Patent: Aug. 18, 2020

(54) DISK DRIVE SUSPENSION

(71) Applicant: NHK SPRING CO., LTD., Yokohama-shi, Kanagawa (JP)

(72) Inventors: Hiroshi Nakayama, Yokohama (JP); Masao Hanya, Yokohama (JP); Tatsuhiko Nishida, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 16/777,924

(22) Filed: Jan. 31, 2020

(30) Foreign Application Priority Data

Feb. 28, 2019 (JP) .................................. 2019-036110

(51) Int. Cl.
*G11B 5/48* (2006.01)

(52) U.S. Cl.
CPC ............ *G11B 5/4833* (2013.01); *G11B 5/486* (2013.01); *G11B 5/4826* (2013.01)

(58) Field of Classification Search
None
See application file for complete search history.

(56) References Cited

U.S. PATENT DOCUMENTS

| 5,428,489 | A | * | 6/1995 | Takamure | ............ | G11B 5/4826 360/244.2 |
| 5,473,487 | A | * | 12/1995 | Nagase | ................ | G11B 5/4826 360/245.6 |
| 5,530,606 | A | * | 6/1996 | Baasch | ................ | G11B 5/4826 360/245.6 |
| 5,936,799 | A | * | 8/1999 | Kuratomi | ................ | G11B 5/48 360/122 |
| 6,967,821 | B2 | * | 11/2005 | Himes | ................ | G11B 5/4826 360/245.3 |
| 7,016,155 | B2 | * | 3/2006 | Kasajima | ............ | G11B 5/4826 360/234.6 |
| 7,336,444 | B2 | * | 2/2008 | Kido | .................... | G11B 5/4826 360/244.9 |
| 8,947,833 | B2 | * | 2/2015 | Hanya | ................ | G11B 5/4853 360/294.4 |
| 9,042,056 | B2 | * | 5/2015 | Hanya | ................ | G11B 5/4826 360/294.4 |
| 9,117,466 | B2 | * | 8/2015 | Takikawa | ............ | G11B 5/4826 |
| 2003/0007288 | A1 | * | 1/2003 | Kasajima | ............ | G11B 5/4826 360/234.6 |
| 2004/0190202 | A1 | * | 9/2004 | Koh | .................... | G11B 5/4826 360/245.1 |
| 2010/0061020 | A1 | * | 3/2010 | Maslov | ................ | G11B 5/4833 360/244.2 |

FOREIGN PATENT DOCUMENTS

JP 2010086630 A 4/2010

\* cited by examiner

*Primary Examiner* — William J Klimowicz
(74) *Attorney, Agent, or Firm* — Holtz, Holtz & Volek PC

(57) ABSTRACT

A flexure is provided along a first surface of a load beam. The flexure includes a tongue on which a slider is mounted, a first outrigger arm, and a second outrigger arm. A first damping member is provided in a first outrigger root portion. The first damping member adheres to both the load beam and the first outrigger root portion in a first aperture portion including a first aperture formed in the load beam. A second damping member is provided in a second outrigger root portion. The second damping member adheres to both the load beam and the second outrigger root portion in a second aperture portion including a second aperture.

8 Claims, 11 Drawing Sheets

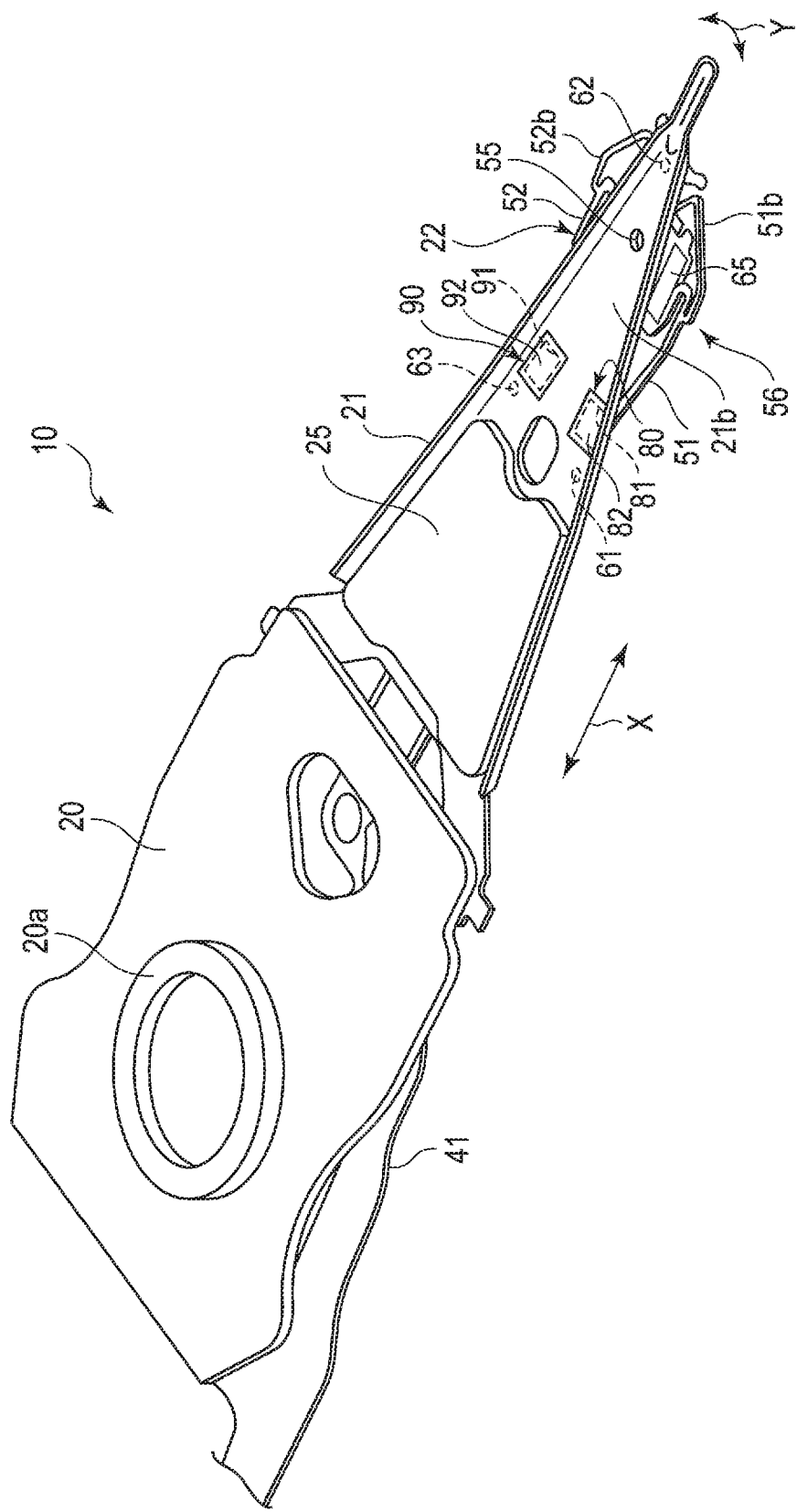
F I G. 3

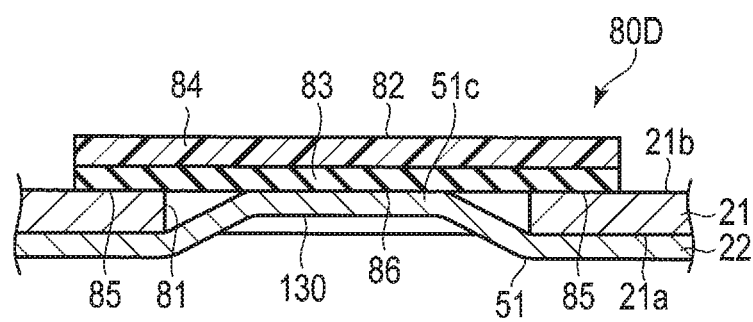
F I G. 14
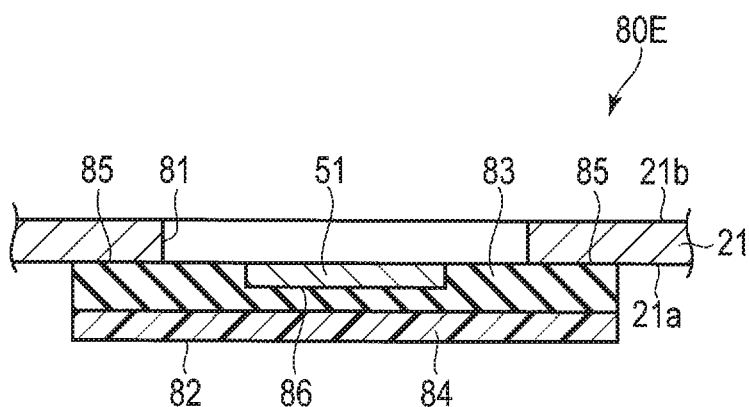
F I G. 15

DISK DRIVE SUSPENSION

CROSS-REFERENCE TO RELATED APPLICATIONS

This application is based upon and claims the benefit of priority from prior Japanese Patent Application No. 2019-036110, filed Feb. 28, 2019, the entire contents of which are incorporated herein by reference.

BACKGROUND OF THE INVENTION

1. Field of the Invention

The present invention relates to a disk drive suspension used for a hard disk drive, etc., in particular, a suspension comprising a vibration suppression unit which suppresses the vibration of a flexure.

2. Description of the Related Art

A hard disk drive (HDD) is used for an information processing device such as a personal computer. The hard disk drive includes a magnetic disk which rotates about a spindle, a carriage which turns about a pivot, etc. The carriage comprises an actuator arm, and is turned in the track width direction of the disk about the pivot by a positioning motor such as a voice coil motor.

To the actuator arm, a disk drive suspension (hereinafter, simply referred to as a suspension) is attached. The suspension includes a load beam, a flexure provided to overlap the load beam, etc. A slider which constitutes a magnetic head is provided in a gimbal portion formed near the distal end of the flexure. In the slider, elements (transducers) for accessing data, for example, for reading or writing data, are provided. The load beam, the flexure, the slider, etc., constitute a head gimbal assembly.

The gimbal portion includes a tongue on which the slider is mounted, and first and second outriggers formed on the both sides of the vicinities of the tongue. These outriggers jut into the outside of the flexure on the both side portions of the flexure. The vicinities of the both end portions of the first and second outriggers in the length direction are secured to the load beam by securing portions such as laser welding. Each of the first and second outriggers can be deformed in the thickness direction like a spring, and serves an important role to ensure the gimbal movement of the tongue.

To deal with increased recording density of disks, the size of the head gimbal assembly needs to be further reduced. In addition, the slider should be more precisely positioned with respect to the recording surface of each disk. To achieve this object, it is necessary to reduce the vibration of the flexure as much as possible while ensuring the gimbal movement required for the head gimbal assembly. For example, U.S. Pat. No. 6,967,821 B2 (Patent Literature 1) and JP 2010-86630 A (Patent Literature 2) disclose a damping member for suppressing the vibration of a flexure. The damping member is provided in a part of a suspension.

When a vibration is input, the suppression of the vibration of an outrigger may be effective in reducing the vibration of a flexure. Thus, a damping member could be provided in the outrigger itself. Specifically, a damping member is attached to the outrigger so that the outrigger and the damping member can integrally move. However, if a damping member is attached to the outrigger, although the vibration of the flexure can be suppressed, the stiffness of the flexure is increased. For example, it is assumed that a damping member extending in the length direction of the outrigger is attached to the outrigger. In this type of flexure, the stiffness in a pitch direction and the stiffness in a roll direction are increased in comparison with a flexure which does not comprise a damping member. Thus, such a flexure is not preferable for gimbal movement.

BRIEF SUMMARY OF THE INVENTION

Accordingly, the object of the present invention is to provide a disk drive suspension which can effectively suppress the vibration of a flexure and also prevent an increase in the stiffness of the flexure.

According to an embodiment, a disk drive suspension comprises a load beam, a flexure, securing portions, a first outrigger vibration suppression portion and a second outrigger vibration suppression portion. The load beam comprises a first surface, and a second surface on a side opposite to the first surface. The flexure is provided along the first surface of the load beam. The flexure comprises a tongue on which a slider is mounted, a first outrigger arm and a second outrigger arm. The first outrigger arm is provided on an outer side of the tongue in a width direction, and extends in a length direction of the load beam. The second outrigger arm is provided on the other outer side of the tongue in the width direction, and extends in the length direction of the load beam. The securing portions secure a proximal portion of the first outrigger arm and a proximal portion of the second outrigger arm to the load beam.

The first outrigger vibration suppression portion comprises a first damping member. The first damping member is provided in a first outrigger root portion including the proximal portion of the first outrigger arm. A part of the first damping member adheres to the load beam. Another part of the first damping member adheres to the first outrigger arm.

The second outrigger vibration suppression portion comprises a second damping member. The second damping member is provided in a second outrigger root portion including the proximal portion of the second outrigger arm. A part of the second damping member adheres to the load beam. Another part of the second damping member adheres to the second outrigger arm.

The first outrigger arm and the second outrigger arm are part of a metal base of the flexure, and have shapes projecting to the both outer sides of the tongue. Each of the first outrigger arm and the second outrigger arm can be deformed like a spring in a thickness direction of the flexure.

The flexure of the present embodiment comprises the tongue, the first outrigger arm, the second outrigger arm, the first outrigger vibration suppression portion and the second outrigger vibration suppression portion. According to the present embodiment, the vibration of the flexure can be effectively suppressed by the first outrigger vibration suppression portion and the second outrigger vibration suppression portion. In addition, an increase in the stiffness of the flexure can be prevented. In this way, it is possible to avoid a detrimental effect on gimbal movement.

An example of the first outrigger vibration suppression portion comprises a first aperture portion, a first load beam adhesion portion and a first outrigger adhesion portion. The first aperture portion includes a first aperture formed in the load beam. The first load beam adhesion portion is formed by causing a part of the first damping member to adhere to the second surface of the load beam. The first outrigger adhesion portion is formed by causing another part of the first damping member to adhere to the first outrigger root portion inside the first aperture.

An example of the second outrigger vibration suppression portion comprises a second aperture portion, a second load beam adhesion portion and a second outrigger adhesion portion. The second aperture portion includes a second aperture formed in the load beam. The second load beam adhesion portion is formed by causing a part of the second damping member to adhere to the second surface of the load beam. The second outrigger adhesion portion is formed by causing another part of the second damping member to adhere to the second outrigger root portion inside the second aperture.

The first outrigger vibration suppression portion may comprise a first spacer. The first spacer is provided between the first damping member and the first outrigger root portion inside the first aperture. The second outrigger vibration suppression portion may comprise a second spacer. The second spacer is provided between the second damping member and the second outrigger root portion inside the second aperture.

An example of the first outrigger vibration suppression portion comprises the first damping member having a shape covering the first aperture, the first load beam adhesion portion present around the first aperture, and the first outrigger adhesion portion present inside the first aperture. An example of the second outrigger vibration suppression portion comprises the second damping member having a shape covering the second aperture, the second load beam adhesion portion present around the second aperture, and the second outrigger adhesion portion present inside the second aperture.

Another example of the first outrigger vibration suppression portion comprises the first damping member having a rectangular shape extending in a length direction of the first aperture, the first load beam adhesion portion present in each end portion of the first damping member, and the first outrigger adhesion portion present inside the first aperture. Another example of the second outrigger vibration suppression portion comprises the second damping member having a rectangular shape extending in a length direction of the second aperture, the second load beam adhesion portion present in each end portion of the second damping member, and the second outrigger adhesion portion present inside the second aperture.

Another example of the first outrigger vibration suppression portion comprises the first damping member having a cruciform shape. The cruciform first damping member includes a vertical portion extending in a length direction of the first aperture and a lateral portion extending in a width direction of the first aperture. The second outrigger vibration suppression portion may comprise the second damping member having a cruciform shape. The cruciform second damping member includes a vertical portion extending in a length direction of the second aperture and a lateral portion extending in a width direction of the second aperture.

An example of the first outrigger vibration suppression portion comprises a first bending portion inserted into the first aperture in a part of the first outrigger arm in a length direction. The first outrigger adhesion portion is formed by causing the first bending portion to adhere to the first damping member in the first aperture. An example of the second outrigger vibration suppression portion comprises a second bending portion inserted into the second aperture in a part of the second outrigger arm in a length direction. The second outrigger adhesion portion is formed by causing the second bending portion to adhere to the second damping member in the second aperture.

The first outrigger vibration suppression portion may comprise the first damping member provided on the first surface of the load beam, a first load beam adhesion portion formed by causing a part of the first damping member to adhere to the first surface, and a first outrigger adhesion portion formed by causing another part of the first damping member to adhere to the first outrigger root portion. The second outrigger vibration suppression portion may comprise the second damping member provided on the first surface of the load beam, a second load beam adhesion portion formed by causing a part of the second damping member to adhere to the first surface, and a second outrigger adhesion portion formed by causing another part of the second damping member to adhere to the second outrigger root portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective illustration showing a disk drive suspension according to a first embodiment.

FIG. 14 is a cross-sectional view of an outrigger vibration suppression portion according to a fifth embodiment.

FIG. 15 is a cross-sectional view of an outrigger vibration suppression portion according to a sixth embodiment.

DETAILED DESCRIPTION OF THE INVENTION

Hereinafter, this specification explains a disk drive suspension according to a first embodiment with reference to FIG. 1 to FIG. 10.

Figure 1:
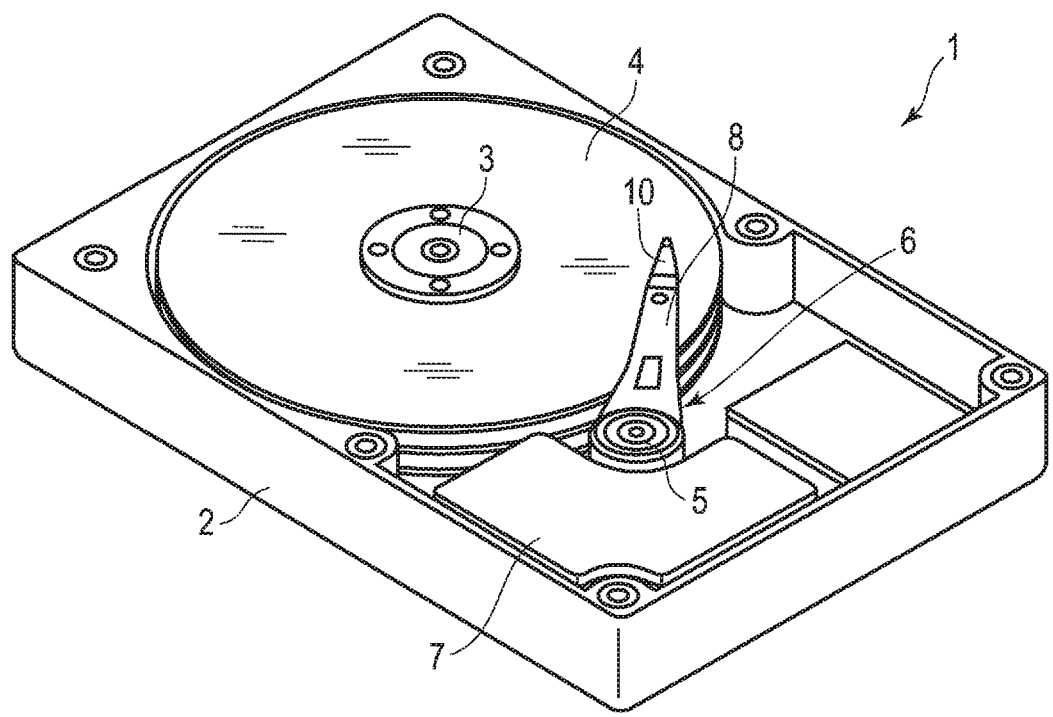
FIG. 1 is a perspective illustration showing an example of a disk drive.

FIG. 1 shows a disk drive (HDD) 1 comprising a case 2, a disk 4 which rotates about a spindle 3, a carriage 6 turnable about a pivot 5, a positioning motor (voice coil motor) 7 for driving the carriage 6, etc. The case 2 is sealed by a lid (not shown).

Figure 2:
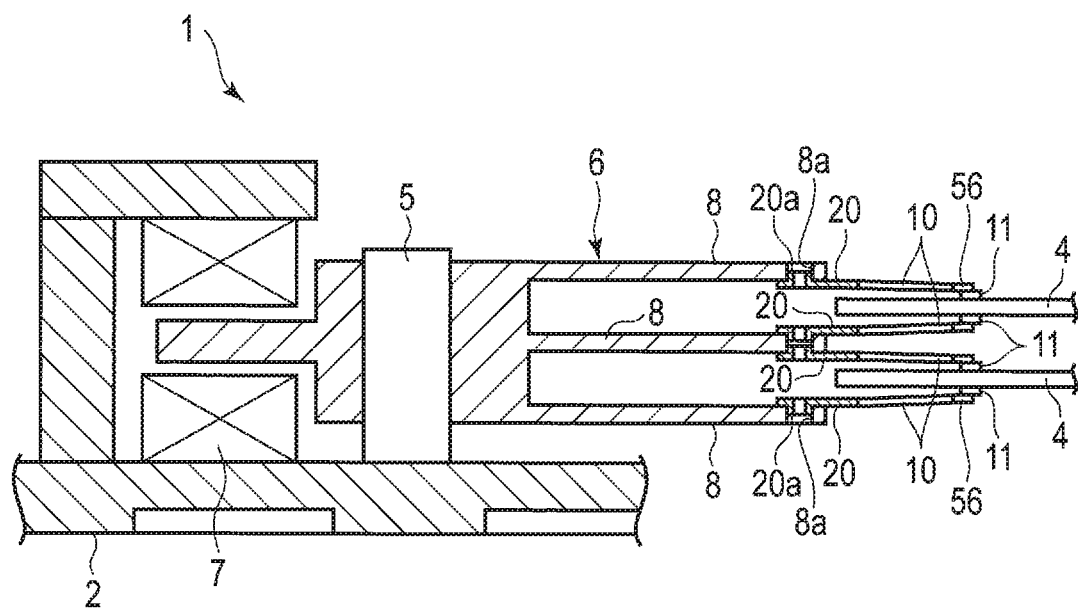
FIG. 2 is a cross-sectional view of a part of the disk drive shown in FIG. 1.

FIG. 2 is a cross-sectional view schematically showing a part of the disk drive 1. As shown in FIG. 1 and FIG. 2, an arm (carriage arm) 8 is provided in the carriage 6. A suspension 10 is attached to the distal end portion of the arm 8. A slider 11 which constitutes a magnetic head is provided in the distal end portion of the suspension 10. When the disk 4 rotates at high speed, air flows in between the disk 4 and the slider 11, thereby forming an air bearing. When the carriage 6 is turned by the positioning motor 7, the suspension 10 moves in the radial direction of the disk 4. In this way, the slider 11 moves to a desired track of the disk 4.

The suspension 10 shown in FIG. 3 comprises a baseplate 20 secured to the arm 8 (shown in FIG. 1 and FIG. 2) of the carriage 6, a load beam 21, and a flexure 22. A boss portion 20a to be inserted into a hole 8a (shown in FIG. 2) formed in the arm 8 is formed in the baseplate 20.

The direction indicated by arrow X in FIG. 3 is the length direction of the load beam 21 and the flexure 22, in other words, the length direction of the suspension 10. The flexure 22 is provided along the load beam 21 and extends in the length direction of the load beam 21. Arrow Y is a sway direction (the width direction of the flexure 22). The load beam 21 comprises a first surface 21a on a side the flexure 22 is provided, and a second surface 21b on a side opposite to the first surface 21a. A damper member 25 is provided in the load beam 21 as needed.

Figure 4:
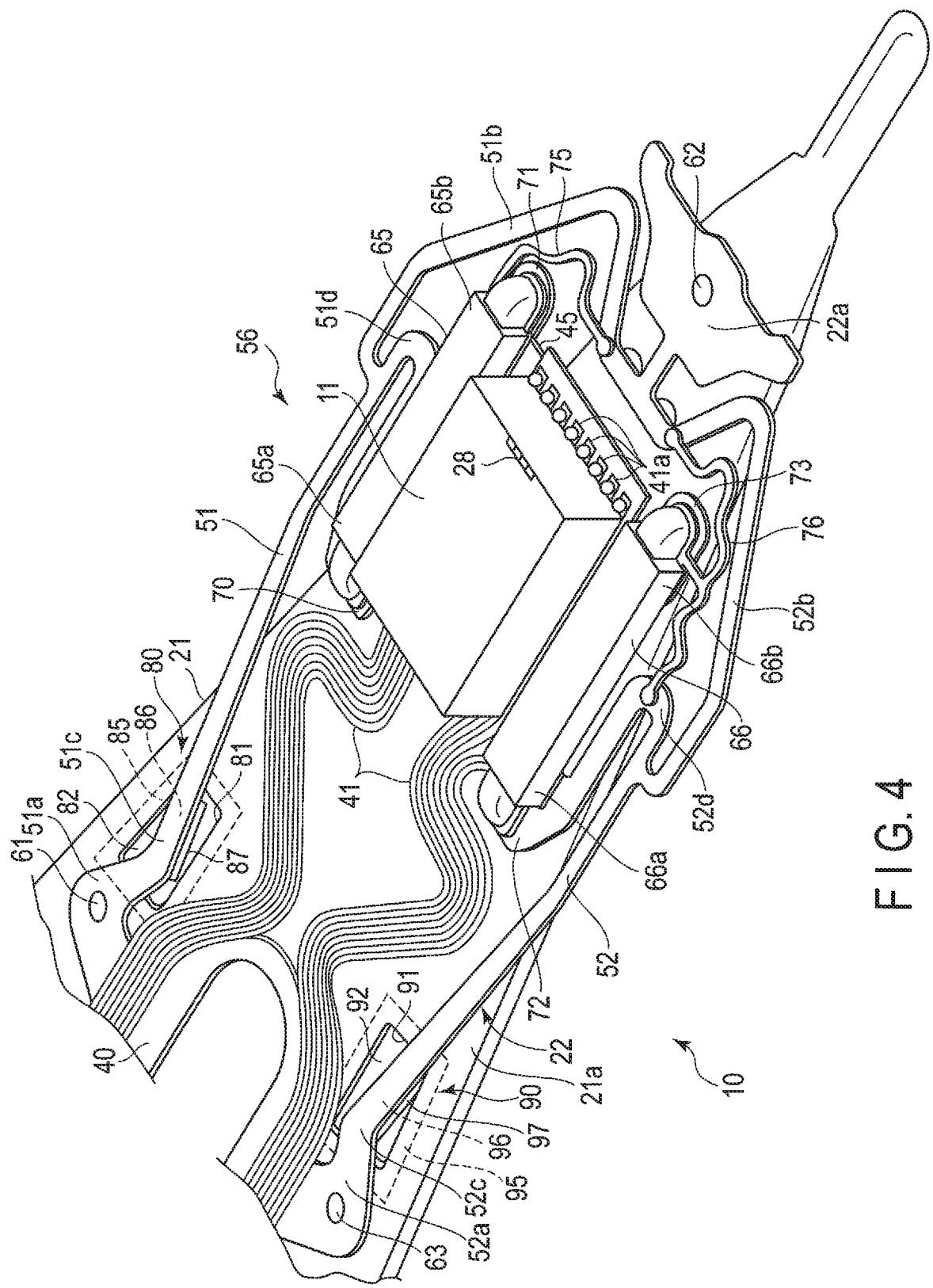
FIG. 4 is a perspective illustration in which a part of the suspension shown in FIG. 3 is seen from the slider side.

FIG. 4 is a perspective illustration in which a part of the distal end side of the suspension 10 is seen from the slider 11 side. In the distal end portion of the slider 11 which constitutes the magnetic head, elements 28 capable of performing conversion between magnetic signals and electric signals, such as magnetoresistive (MR) elements, are provided. These elements 28 are used for accessing data, for example, for writing or reading data, with respect to the disk 4. The slider 11, the load beam 21, the flexure 22 and the like constitute a head gimbal assembly. The flexure 22 is provided on the first surface 21a of the load beam 21.

The flexure 22 comprises a metal base 40 formed of a thin plate of stainless steel, and a circuit portion 41 provided along the metal base 40. The thickness of the metal base 40 (for example, 12 to 25 μm) is less than the thickness of the load beam 21 (for example, 30 μm). For example, the thickness of the metal base 40 is 20 μm. A part of the circuit portion 41 is electrically connected to the elements 28 of the slider 11 via terminals 41a (shown in FIG. 4) for the slider 11.

Figure 5:
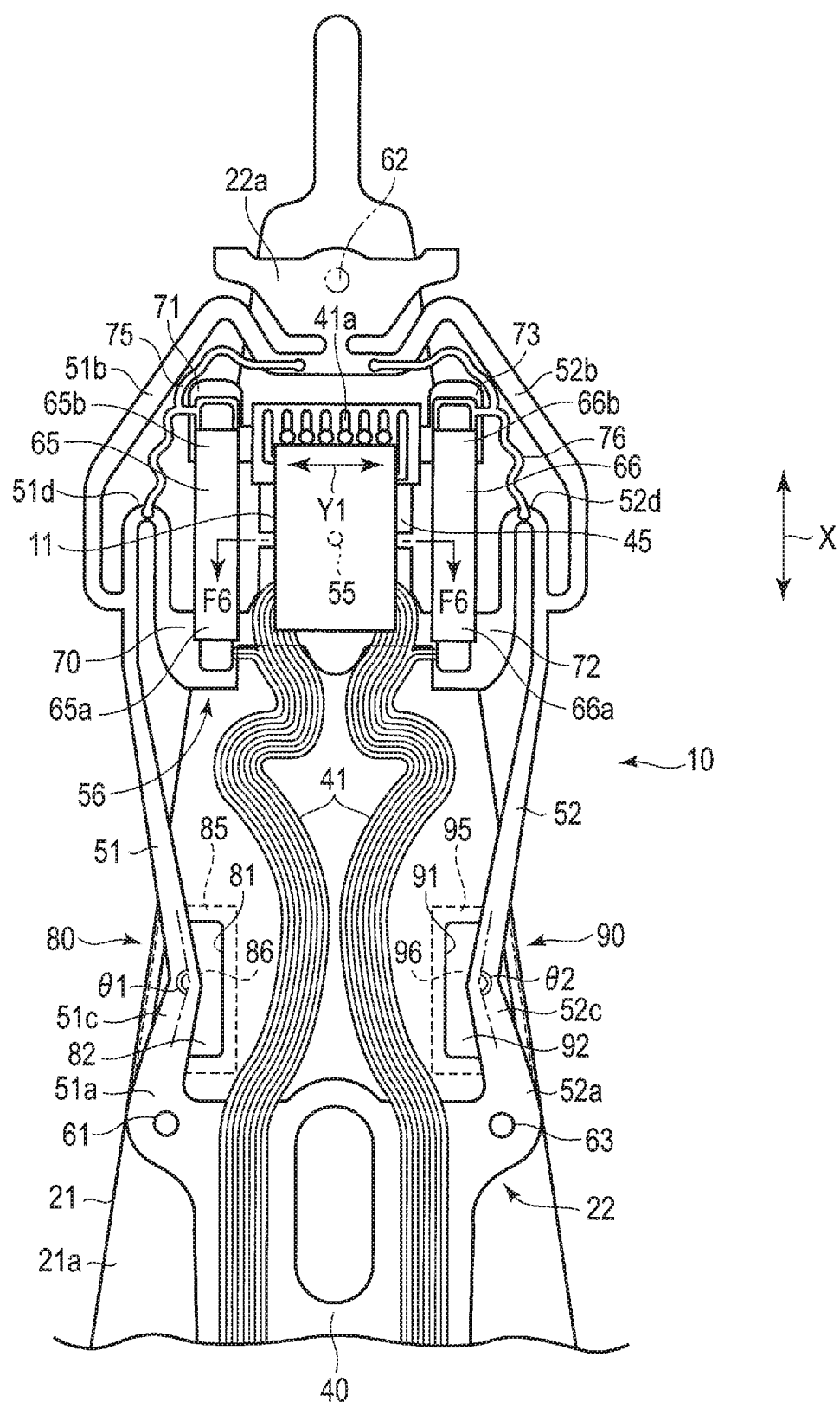
FIG. 5 is a plan view of a part of the suspension shown in FIG. 4.

FIG. 5 is a plan view in which the vicinity of the distal end portion of the suspension 10 is seen from the slider 11 side.

A tongue 45 on which the slider 11 is mounted is formed in a part of the metal base 40. A first outrigger arm 51 and a second outrigger arm 52 are formed on the both outer sides of the tongue 45 in the width direction (indicated by arrow Y1 in FIG. 5) of the tongue 45. The first outrigger arm 51 and the second outrigger arm 52 have shapes projecting to the outer sides of the both lateral portions of the tongue 45 in the width direction of the tongue 45. The tongue 45 and a pair of outrigger arms 51 and 52 are part of the metal base 40. The outline of each of the tongue 45 and the outrigger arms 51 and 52 is formed by, for example, etching.

Figure 6:
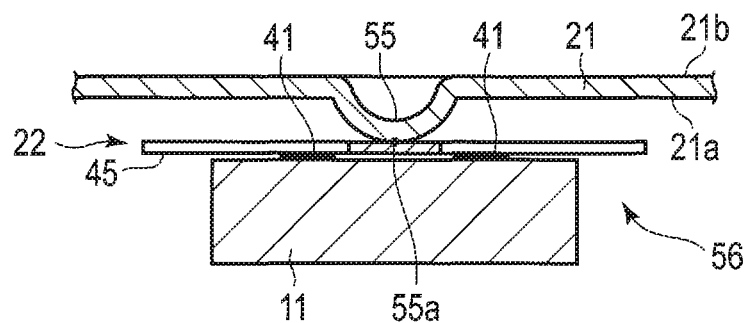
FIG. 6 is a cross-sectional view of a part of the suspension along line F6-F6 of FIG. 5.

FIG. 6 is a cross-sectional view of a part of the suspension 10 along line F6-F6 of FIG. 5. A dimple 55 protruding to the tongue 45 is formed near the distal end of the load beam 21. A distal end 55a of the dimple 55 is in contact with the tongue 45. The tongue 45 swings based on the distal end 55a of the dimple 55 and is capable of performing a desired gimbal movement. The tongue 45, the outrigger arms 51 and 52, the dimple 55, etc., constitute a gimbal portion 56.

The first outrigger arm 51 is provided on the outer side of a lateral portion of the tongue 45 and extends in the length direction (indicated by arrow X in FIG. 5) of the flexure 22. The first outrigger arm 51 comprises a proximal portion 51a secured to the load beam 21 by a securing portion 61. The first outrigger arm 51 comprises a distal end side arm portion 51b continuous with a distal end portion 22a of the flexure 22. The distal end portion 22a of the flexure 22 is secured to the vicinity of the distal end of the load beam 21 by a securing portion 62. The securing portions 61 and 62 are formed by, for example, laser spot welding. The both end portions of the first outrigger arm 51 in the length direction are supported by the securing portions 61 and 62. The portion between the securing portions 61 and 62 can be deformed in the thickness direction of the metal base 40.

In this specification, a portion which is a part of the first outrigger arm 51 in the length direction and is near the proximal portion 51a including the securing portion 61 is referred to as a first outrigger root portion 51c. As shown in FIG. 5, the first outrigger root portion 51c has a shape angled at angle θ1. The vicinity of the distal end portion of the first outrigger arm 51 is connected to a lateral portion of the tongue 45 via a connection portion 51d.

The second outrigger arm 52 is provided on the outer side of the other lateral portion of the tongue 45 and extends in the length direction (indicated by arrow X in FIG. 5) of the flexure 22. The second outrigger arm 52 comprises a proximal portion 52a secured to the load beam 21 by a securing portion 63. The second outrigger arm 52 comprises a distal end side arm portion 52b continuous with the distal end portion 22a of the flexure 22.

In this specification, a portion which is a part of the second outrigger arm 52 in the length direction and is near the proximal portion 52a including the securing portion 63 is referred to as a second outrigger root portion 52c. As shown in FIG. 5, the second outrigger root portion 52c has a shape angled at angle θ2. The vicinity of the distal end portion of the second outrigger arm 52 is connected to the other lateral portion of the tongue 45 via a connection portion 52d.

The both end portions of the second outrigger arm 52 in the length direction are supported by the securing portions 62 and 63. The portion between the securing portions 62 and 63 can be deformed in the thickness direction of the metal base 40. The tongue 45 is elastically supported by the first outrigger arm 51 and the second outrigger arm 52. Thus, the tongue 45 is capable of swing based on the dimple 55.

A pair of microactuator elements 65 and 66 is mounted in the gimbal portion 56. The microactuator elements 65 and 66 are formed of piezoelectric materials, and are provided on the both sides of the slider 11. The first microactuator element 65 comprises both end portions 65a and 65b secured to actuator supporting portions 70 and 71 of the tongue 45, respectively. The second microactuator element 66 comprises both end portions 66a and 66b secured to actuator supporting portions 72 and 73 of the tongue 45, respectively.

The microactuator elements 65 and 66 have a function of rotating the tongue 45 in a sway direction (indicated by arrow Y in FIG. 3). A limiter member 75 which prevents the tongue 45 from excessively swing is provided between a lateral portion of the tongue 45 and the first outrigger arm 51. Similarly, a limiter member 76 is provided between the other lateral portion of the tongue 45 and the second outrigger arm 52.

The suspension 10 of the present embodiment comprises a first outrigger vibration suppression portion 80 corresponding to the first outrigger arm 51 and a second outrigger vibration suppression portion 90 corresponding to the second outrigger arm 52. Each of the first and second outrigger vibration suppression portions 80 and 90 functions as a vibration suppression unit which suppresses the vibration of the flexure 22.

Figure 7:
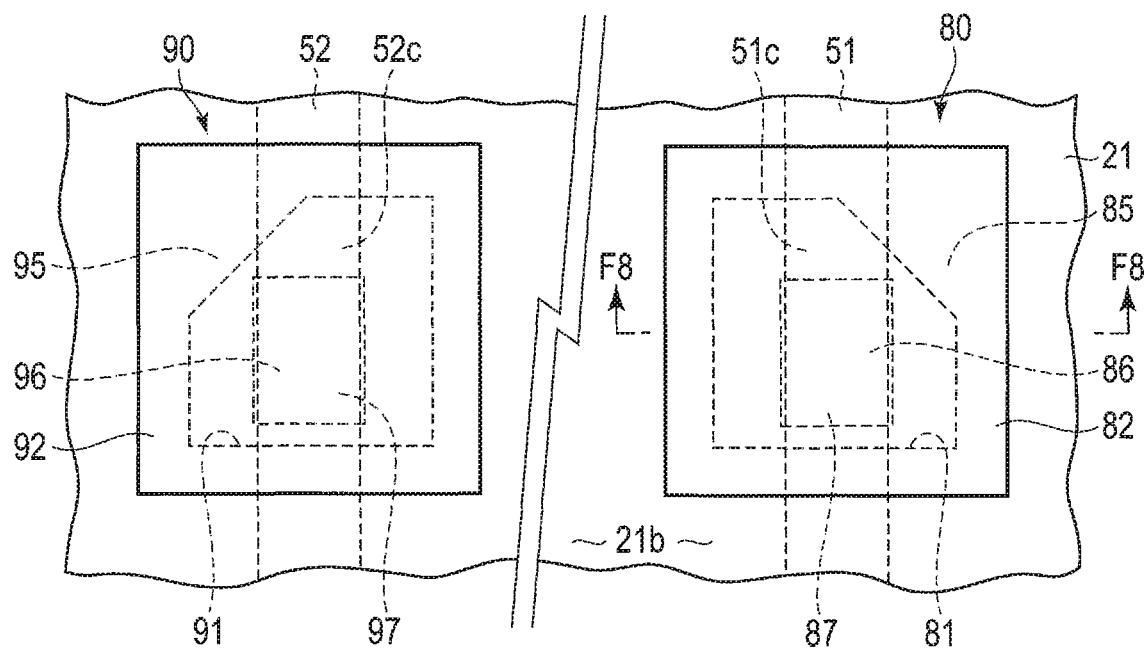
FIG. 7 is a plan view schematically showing the outrigger vibration suppression portions of the suspension shown in FIG. 4.
Figure 8:
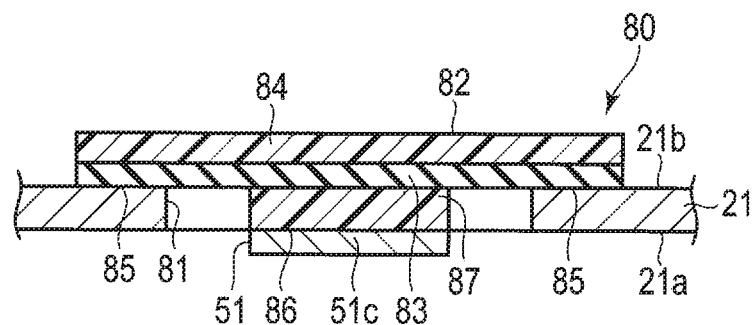
FIG. 8 is a cross-sectional view of the outrigger vibration suppression portion along line F8-F8 of FIG. 7.

FIG. 7 is a plan view schematically showing the first outrigger vibration suppression portion 80 and the second outrigger vibration suppression portion 90. The first outrigger vibration suppression portion 80 and the second outrigger vibration suppression portion 90 are bilaterally symmetric. Their structures are substantially the same as each other. FIG. 8 is a cross-sectional view of the first outrigger vibration suppression portion 80.

The first outrigger vibration suppression portion 80 includes a first aperture 81 formed in the load beam 21, and a first damping member 82 provided in the first outrigger root portion 51c. The first aperture 81 penetrates the load beam 21 in the thickness direction. The first damping member 82 is provided on a second surface 21b of the load beam 21. In this specification, a portion including the first aperture 81 and its peripheral portion is referred to as a first aperture portion.

The first damping member 82 is provided in the first aperture portion. The first damping member 82 has a size so as to cover the first aperture 81. As shown in FIG. 8, the first damping member 82 comprises a viscoelastic material layer 83 and a constrained plate 84. The viscoelastic material layer 83 is formed of a polymeric material (for example, acrylic resin) which can exhibit viscosity resistance when it is deformed. The viscoelastic material layer 83 has viscosity. The thickness of the viscoelastic material layer 83 is, for example, 51 µm. The constrained plate 84 is formed of synthetic resin such as polyester, and is stacked in the thickness direction of the viscoelastic material layer 83. The thickness of the constrained plate 84 is, for example, 51 µm.

As shown in FIG. 3 to FIG. 5 and FIG. 7, the first outrigger root portion 51c is provided at a position facing the first aperture 81. The first outrigger root portion 51c is a part of the outrigger arm 51 in the length direction. The first damping member 82 covers the first aperture 81. The damping member 82 is provided on the second surface 21b of the load beam 21. The first damping member 82 is secured to both the second surface 21b of the load beam 21 and the first outrigger root portion 51c by the adhesion of the viscoelastic material layer 83.

Thus, a part of the viscoelastic material layer 83 of the first damping member 82 adheres to the second surface 21b of the load beam 21 in the first aperture portion. In this way, a first load beam adhesion portion 85 is formed. Another part of the viscoelastic material layer 83 of the first damping member 82 adheres to the first outrigger root portion 51c inside the first aperture 81. In this way, a first outrigger adhesion portion 86 is formed.

As shown in FIG. 8, the first outrigger vibration suppression portion 80 may include a first spacer 87. The first spacer 87 is provided between the viscoelastic material layer 83 of the first damping member 82 and the first outrigger root portion 51c. The thickness of the first spacer 87 should be preferably equal to the thickness of the load beam 21. An adhesive layer is provided on a surface of the first spacer 87 (in other words, the surface facing the outrigger root portion 51c). The first damping member 82 adheres to the first outrigger arm 51 via the first spacer 87. Thus, the first outrigger adhesion portion 86 is formed between the first damping member 82 and the first outrigger root portion 51c.

The second outrigger vibration suppression portion 90 includes a second aperture 91 formed in the load beam 21, and a second damping member 92 provided in the second outrigger root portion 52c. The second aperture 91 penetrates the load beam 21 in the thickness direction. The second damping member 92 is provided on the second surface 21b of the load beam 21. In this specification, a portion including the second aperture 91 and its peripheral portion is referred to as a second aperture portion.

The second damping member 92 is provided in the second aperture portion. The second damping member 92 has a size so as to cover the second aperture 91. The second damping member 92 comprises the viscoelastic material layer 83 and the constrained plate 84 (shown in FIG. 8) in a manner similar to that of the first damping member 82.

As shown in FIG. 3 to FIG. 5 and FIG. 7, the second outrigger root portion 52c is provided at a position facing the second aperture 91. The second outrigger root portion 52c is a part of the outrigger arm 52 in the length direction. The second damping member 92 covers the second aperture 91. The damping member 92 is provided on the second surface 21b of the load beam 21. The second damping member 92 is secured to both the second surface 21b of the load beam 21 and the second outrigger root portion 52c by the adhesion of the viscoelastic material layer.

Thus, a part of the viscoelastic material layer of the second damping member 92 adheres to the second surface 21b of the load beam 21 in the second aperture portion. In this way, a second load beam adhesion portion 95 is formed. Another part of the viscoelastic material layer of the second damping member 92 adheres to the second outrigger root portion 52c inside the second aperture 91. In this way, a second outrigger adhesion portion 96 is formed.

The second outrigger vibration suppression portion 90 includes a second spacer 97 similar to the first spacer 87 (shown in FIG. 8). The second spacer 97 is provided between the viscoelastic material layer of the second damping member 92 and the second outrigger root portion 52c. The second damping member 92 adheres to the second outrigger arm 52 via the second spacer 97. Thus, the second outrigger adhesion portion is formed between the second damping member 92 and the second outrigger root portion 52c. The thickness of the second spacer 97 should be preferably equal to the thickness of the load beam 21.

Now, the operation of the suspension 10 of the present embodiment is explained.

When the carriage 6 (shown in FIG. 1 and FIG. 2) is turned by the positioning motor 7, the suspension 10 moves in the radial direction of the disk 4. In this way, the slider 11 of the magnetic head moves to a desired track of the recording surface of the disk 4. When voltage is applied to the microactuator elements 65 and 66, the microactuator elements 65 and 66 are distorted based on the voltage. In this way, the load beam 21 slightly moves in a sway direction (indicated by arrow Y in FIG. 3).

The suspension 10 of the present embodiment comprises the outrigger vibration suppression portions 80 and 90 in the outrigger root portions 51c and 52c of the two outrigger arms 51 and 52, respectively. The outrigger root portions 51c and 52c include the proximal portions 51a and 52a, respectively. When energy for vibrating the flexure 22 is input from outside to the suspension 10, the viscoelastic material layer 83 of each of the damping members 82 and 92 is deformed. When the viscoelastic material layer 83 is deformed, internal resistance is caused by the friction of the molecules constituting the viscoelastic material layer 83. Thus, vibration energy is converted into thermal energy, thereby preventing the vibration of the flexure 22.

Figure 9:
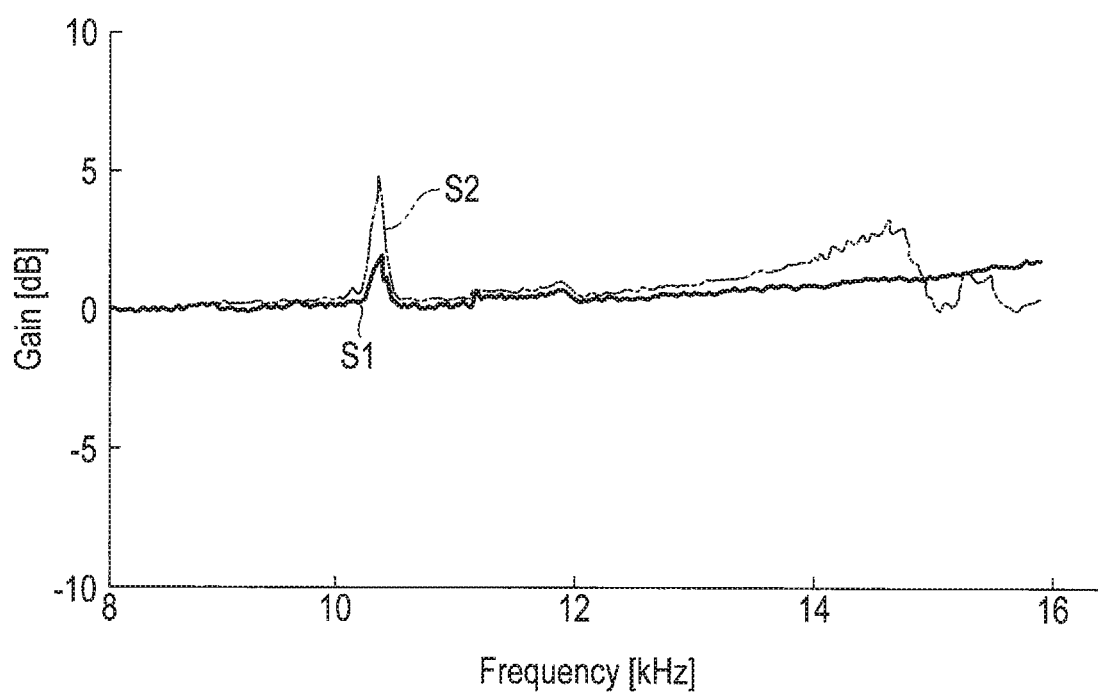
FIG. 9 shows the vibration intensity of a flexure when the suspension comprises the outrigger vibration suppression portions and when the suspension does not comprise the outrigger vibration suppression portions.

FIG. 9 shows the frequency response characteristics when the suspension 10 comprising the outrigger vibration suppression portions 80 and 90 in the present embodiment is vibrated and when a suspension which comprises neither the outrigger vibration suppression portion 80 nor the outrigger vibration suppression portion 90 is vibrated. In FIG. 9, the solid line S1 indicates the frequency response characteristics of the suspension 10 comprising the outrigger vibration suppression portions 80 and 90. In FIG. 9, the dashed line S2 indicates the frequency response characteristics of a suspension which comprises neither the outrigger vibration suspension portion 80 nor the outrigger vibration suppression portion 90. In the suspension 10 comprising the outrigger vibration suppression portions 80 and 90, the torsion mode around 10 to 11 kHz and the gain around 15 kHz are suppressed in comparison with the suspension which comprises neither the outrigger vibration suppression portion 80 nor the outrigger vibration suppression portion 90.

Figure 10:
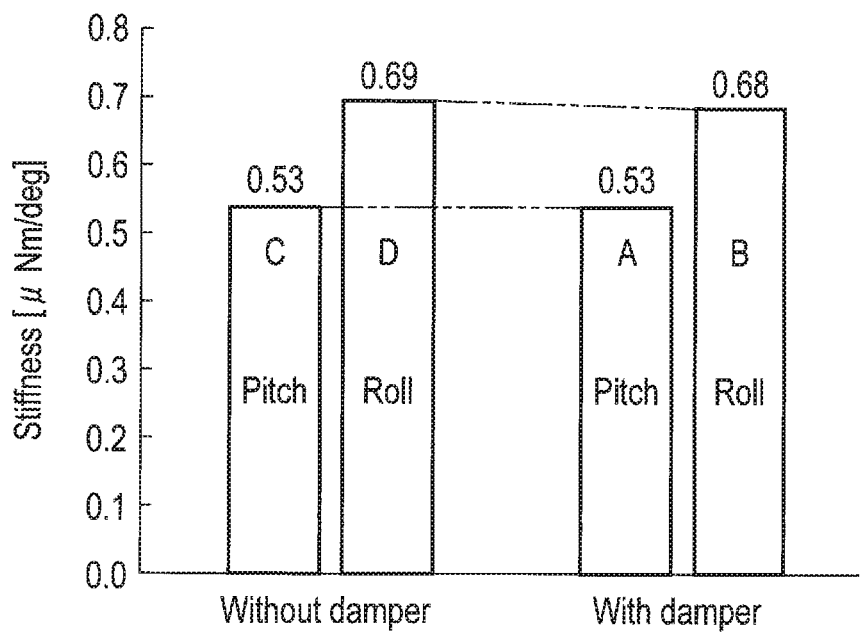
FIG. 10 shows the stiffness of the flexure when the suspension comprises the outrigger vibration suppression portions and when the suspension does not comprise the outrigger vibration suppression portions.

In FIGS. 10, A and B indicate the stiffness in a pitch direction and the stiffness in a roll direction, respectively, in the flexure 22 comprising the outrigger vibration suppression portions 80 and 90. In FIGS. 10, C and D indicate the stiffness in a pitch direction and the stiffness in a roll direction, respectively, in a flexure which comprises neither the outrigger vibration suppression portion 80 nor the outrigger vibration suppression portion 90. As shown in A and C of FIG. 10, regarding the stiffness in a pitch direction, the stiffness of the flexure 22 comprising the outrigger vibration suppression portions 80 and 90 is substantially equal to the stiffness of the flexure which comprises neither the outrigger vibration suppression portion 80 nor the outrigger vibration suppression portion 90. As shown in B and D of FIG. 10, regarding the stiffness in a roll direction, the stiffness of the flexure 22 comprising the outrigger vibration suppression portions 80 and 90 is substantially equal to the stiffness of the flexure which comprises neither the outrigger vibration suppression portion 80 nor the outrigger vibration suppression portion 90. This figure confirms that the provision of the outrigger vibration suppression portions 80 and 90 does not detrimentally affect the gimbal movement of the flexure.

Figure 11:
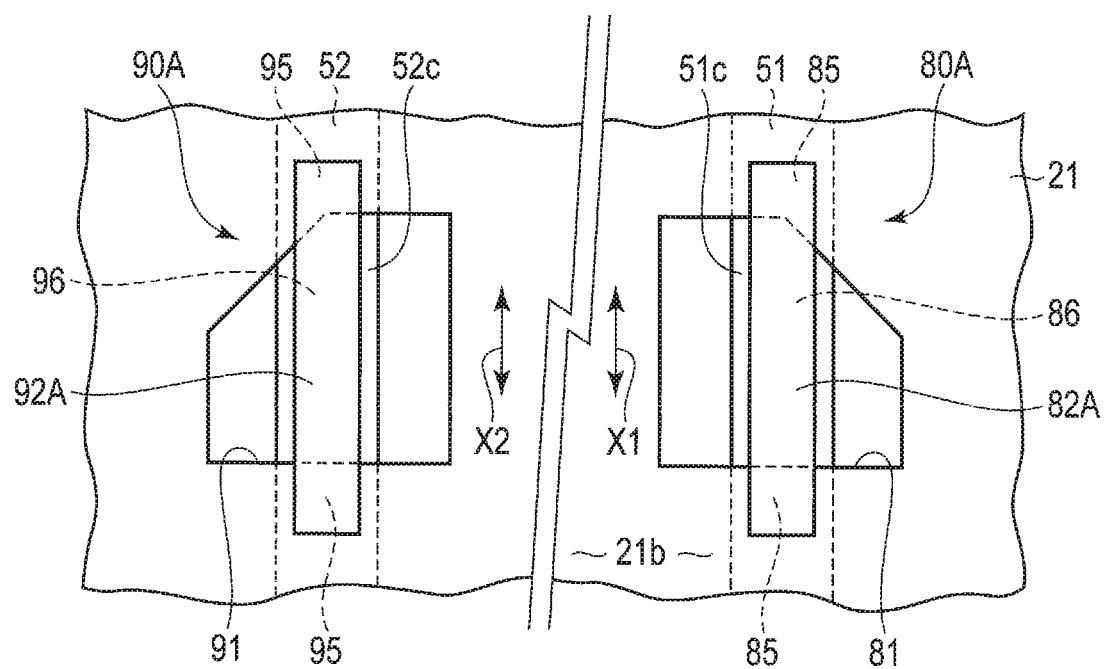
FIG. 11 is a plan view schematically showing outrigger vibration suppression portions according to a second embodiment.

FIG. 11 shows a first outrigger vibration suppression portion 80A and a second outrigger vibration suppression portion 90A according to a second embodiment. A first damping member 82A provided in the first outrigger vibration suppression portion 80A has a rectangular shape extending in the length direction X1 of a first aperture 81. A first load beam adhesion portion 85 is formed in each end portion of the first damping member 82A. A first outrigger adhesion portion 86 is formed inside the first aperture 81.

A second damping member 92A provided in the second outrigger vibration suppression portion 90A has a rectangular shape extending in the length direction X2 of a second aperture 91. A second load beam adhesion portion 95 is formed in each end portion of the second damping member 92A. A second outrigger adhesion portion 96 is formed inside the second aperture 91. The other structures and effects are common to the suspension 10 of the first embodiment and the suspension of the second embodiment. Thus, common reference numbers are added to portions that are common to the first and second embodiments, an explanation thereof being omitted.

Figure 12:
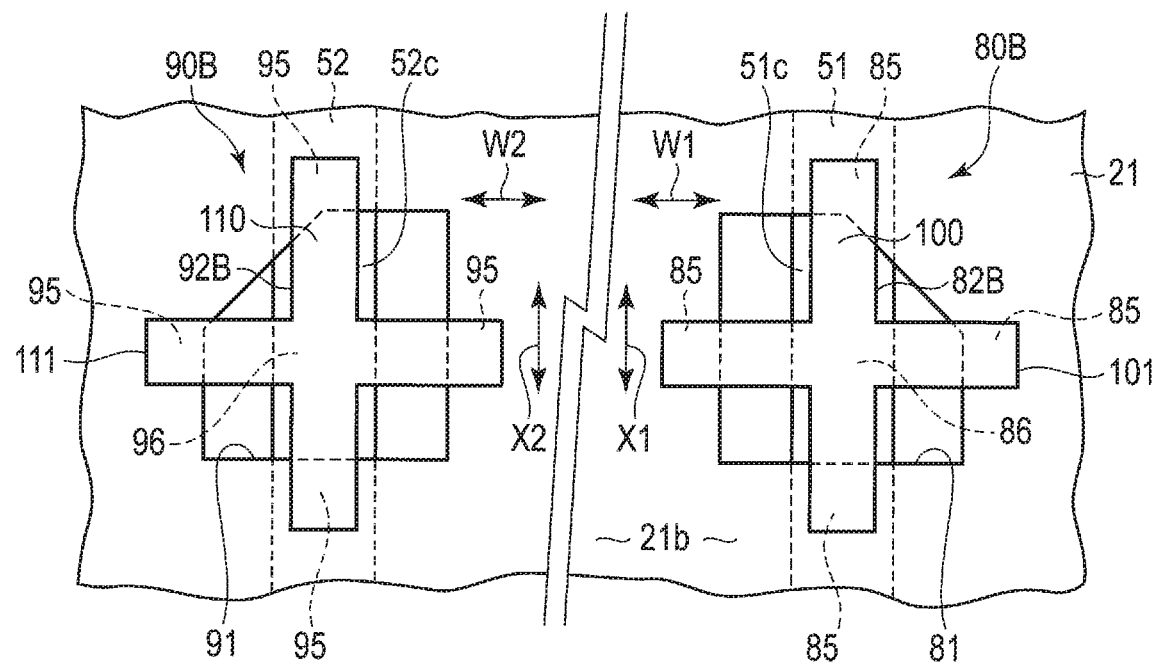
FIG. 12 is a plan view schematically showing outrigger vibration suppression portions according to a third embodiment.

FIG. 12 shows a first outrigger vibration suppression portion 80B and a second outrigger vibration suppression portion 90B according to a third embodiment. A first damping member 82B is cruciform. The cruciform damping member 82B includes a vertical portion 100 and a lateral portion 101. The vertical portion 100 extends in the length direction X1 of a first aperture 81. The lateral portion 101 extends in the width direction W1 of the first aperture 81. A first load beam adhesion portion 85 is formed in each end portion of the vertical portion 100 and each end portion of the lateral portion 101. Inside the first aperture 81, a first outrigger root portion 51c adheres to the first damping member 82B. Thus, a first outrigger adhesion portion 86 is formed.

FIG. 12 shows a second damping member 92B which is also cruciform. The cruciform damping member 92B includes a vertical portion 110 and a lateral portion 111. The vertical portion 110 extends in the length direction X2 of a second aperture 91. The lateral portion 111 extends in the width direction W2 of the second aperture 91. A second load beam adhesion portion 95 is formed in each end portion of the vertical portion 110 and each end portion of the lateral portion 111. Inside the second aperture 91, a second outrigger root portion 52c adheres to the second damping member 92B. Thus, a second outrigger adhesion portion 96 is formed. The other structures and effects are common to the suspension 10 of the first embodiment and the suspension of the third embodiment. Thus, common reference numbers are added to portions that are common to the first and third embodiments, an explanation thereof being omitted.

Figure 13:
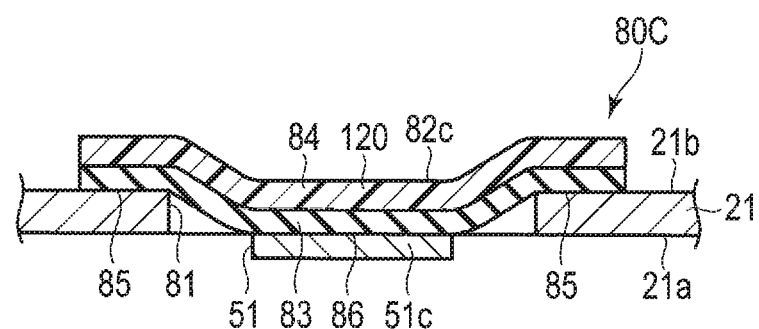
FIG. 13 is a cross-sectional view of an outrigger vibration suppression portion according to a fourth embodiment.

FIG. 13 is a cross-sectional view of a first outrigger vibration suppression portion 80C provided in a suspension according to a fourth embodiment. Although a second outrigger vibration suppression portion is not shown, the structure is common to the first outrigger vibration suppression portion 80C and the second outrigger vibration suppression portion. Thus, the first outrigger vibration suppression portion 80C is explained as a representative example here. The outrigger vibration suppression portion 80C of the present embodiment is deformed such that a part 120 of a first damping member 82 is inserted into the inside of the first aperture 81. The first damping member 82C adheres to a first outrigger root portion 51c. Thus, a first outrigger adhesion portion 86 is formed. The other structures and effects are common to the suspension 10 of the first embodiment and the suspension of the fourth embodiment. Thus, common reference numbers are added to portions that are common to the first and fourth embodiments, an explanation thereof being omitted.

FIG. 14 is a cross-sectional view of a first outrigger vibration suppression portion 80D provided in a suspension according to a fifth embodiment. Although a second outrigger vibration suppression portion is not shown, the structure is common to the first outrigger vibration suppression portion 80D and the second outrigger vibration suppression portion. Thus, the first outrigger vibration suppression portion 80D is explained as a representative example here. The outrigger vibration suppression portion 80D of the present embodiment comprises a bending portion 130 inserted into the inside of a first aperture 81. The bending portion 130 is formed by bending a part of the length direction of a first outrigger arm 51 in a thickness direction by plastic working. A viscoelastic material layer 83 of a first damping member 82D adheres to the bending portion 130. Thus, a first outrigger adhesion portion 86 is formed. The other structures and effects are common the suspension 10 of the first embodiment and the suspension of the fifth embodiment. Thus, common reference numbers are added to portions that are common to the first and fifth embodiments, an explanation thereof being omitted.

FIG. 15 is a cross-sectional view of a first outrigger vibration suppression portion 80E provided in a suspension according to a sixth embodiment. Although a second outrigger vibration suppression portion is not shown, the structure is common to the first outrigger vibration suppression portion 80E and the second outrigger vibration suppression portion. Thus, the first outrigger vibration suppression portion 80E is explained as a representative example here. The outrigger vibration suppression portion 80E of the present embodiment comprises a first damping member 82 provided on a first surface 21a of a load beam 21, a first load beam adhesion portion 85 formed on the first surface 21a, and a first outrigger adhesion portion 86. The first load beam adhesion portion 85 is formed by causing a part of the first damping member 82 to adhere to the first surface 21a of the load beam 21. The first outrigger adhesion portion 86 is formed by causing another part of the first damping member 82 to adhere to a first outrigger arm 51. The other structures and effects are common to the suspension 10 of the first embodiment and the suspension of the sixth embodiment. Thus, common reference numbers are added to portions that are common to the first and sixth embodiments, an explanation thereof being omitted.

Figure 16:
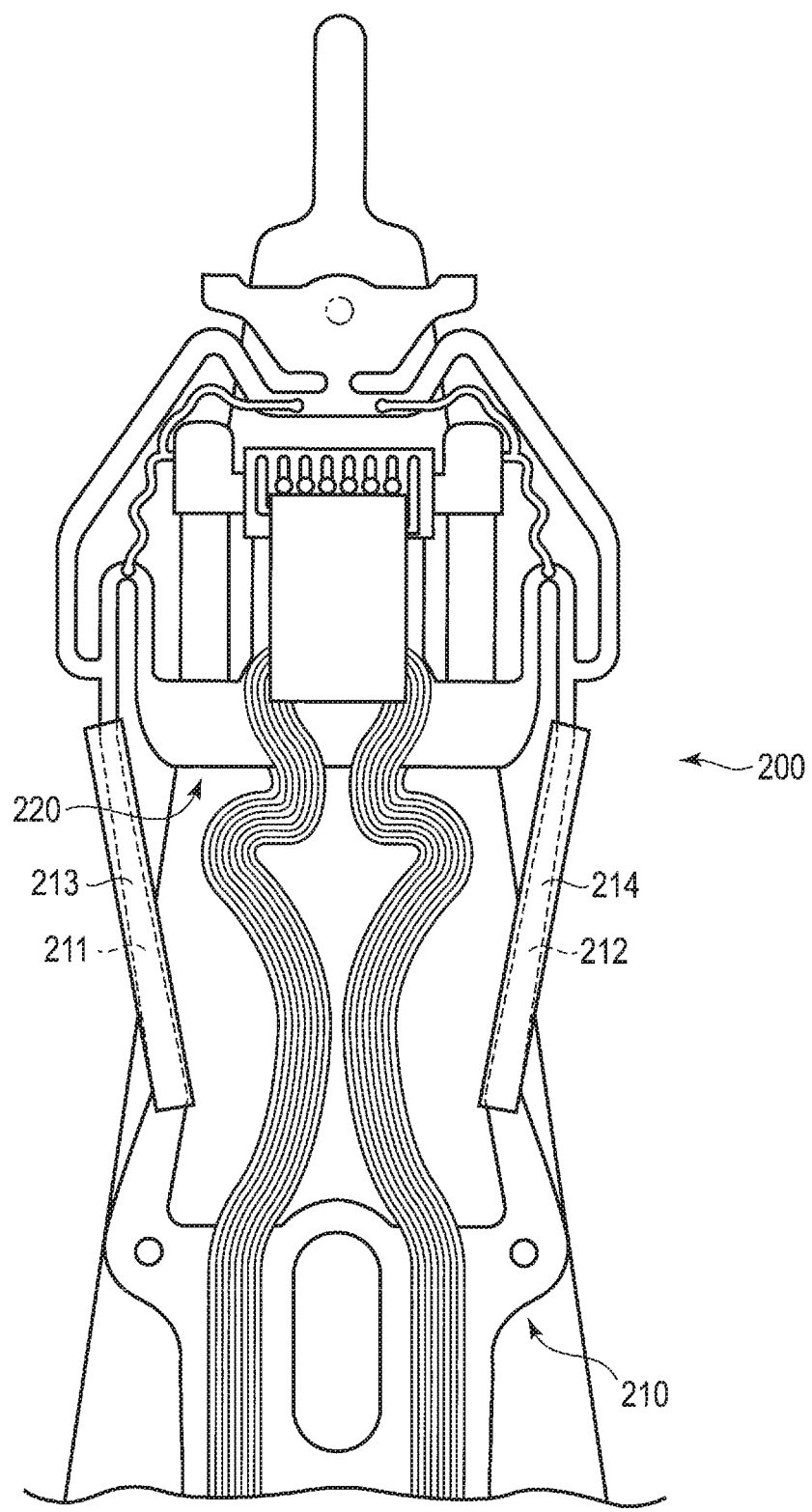
FIG. 16 is a plan view of a part of a suspension according to a comparison example.

FIG. 16 shows a suspension 200 as a comparison example. The suspension 200 comprises slender damping members 213 and 214 on outrigger arms 211 and 212 provided in a flexure 210, respectively. The damping members 213 and 214 adhere to only the outrigger arms 211 and 212, respectively. The damping members 213 and 214 extend in the length directions of the outrigger arms 211 and 212, respectively. This suspension 200 can also prevent the vibration of a gimbal portion 220. However, as explained below, the stiffness of the flexure is great in comparison with a suspension which comprises neither the damping member 213 nor the damping member 214.

Figure 17:
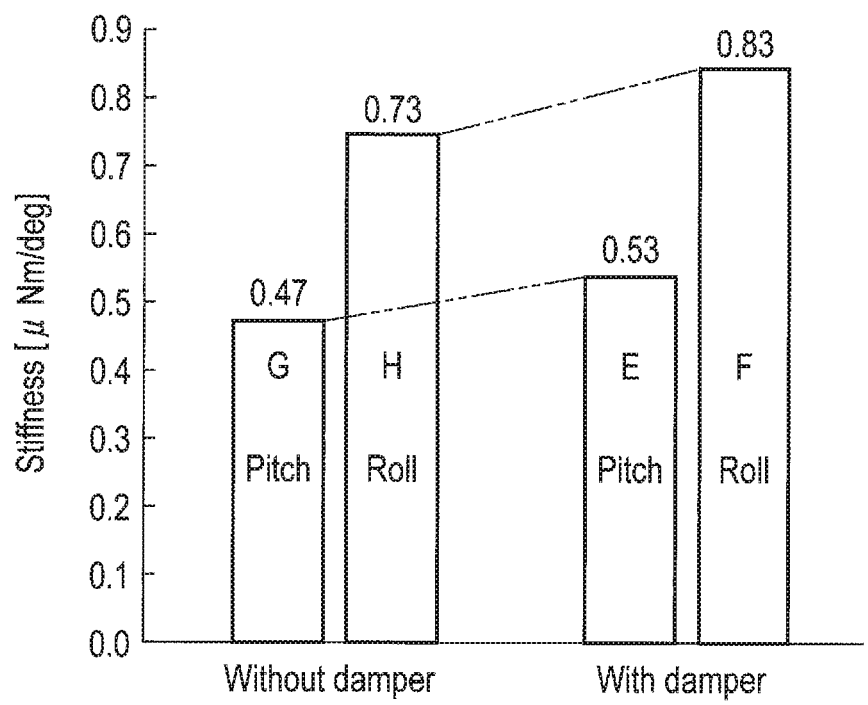
FIG. 17 shows the stiffness of a flexure when the suspension shown in FIG. 16 comprises a damping member and when the suspension does not comprise a damping member.

In FIGS. 17, E and F indicate the stiffness in a pitch direction and the stiffness in a roll direction, respectively, in the suspension 200 of the comparison example shown in FIG. 16. The suspension 200 comprises the damping members 213 and 214. In FIGS. 17, G and H indicate the stiffness in a pitch direction and the stiffness in a roll direction, respectively, in a suspension which comprises neither the damping member 213 nor the damping member 214. Stiffnesses E and F of the flexure comprising the damping members 213 and 214 are increased by approximately 13% compared to the flexure which comprises neither the damping member 213 nor the damping member 214. Thus, the gimbal movement is detrimentally affected.

The damping members 213 and 214 of the comparison example shown in FIG. 16 extend greatly in the length directions of the outrigger arms 211 and 212. Thus, the shipping comb used when the suspension 200 is attached to the disk drive may interfere with the damping members 213 and 214. This may result in a damage to the damping members 213 and 214. In the suspension of each embodiment of the present invention, damping members which are comparatively small are provided in the outrigger root portions 51c and 52c, respectively. Thus, the suspension of each embodiment can prevent the damping members from interfering with the shipping comb.

As a matter of course, when the present invention is implemented, the specific forms of the elements constituting the disk drive suspension, such as the shapes of the load beam and the flexure, and the layout of the first and second outrigger vibration suppression portions, may be changed in various ways. For example, a single damping member in which the first damping member and the second damping member are integrally continuous with each other may be used. The first and second outrigger vibration suppression portions similar to those of each embodiment may be provided in a suspension which comprises neither the microactuator element 65 nor the microactuator element 66.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam comprising a first surface, and a second surface on a side opposite to the first surface;
   a flexure provided along the first surface of the load beam, and comprising a tongue on which a slider is mounted, and first and second outrigger arms provided on both outer sides of the tongue in a width direction and extending in a length direction of the load beam;
   securing portions which secure a proximal portion of the first outrigger arm and a proximal portion of the second outrigger arm to the load beam;
   a first outrigger vibration suppression portion comprising a first damping member provided in a first outrigger root portion including the proximal portion of the first outrigger arm, in which a part of the first damping member adheres to the load beam, and another part of the first damping member adheres to the first outrigger arm; and
   a second outrigger vibration suppression portion comprising a second damping member provided in a second outrigger root portion including the proximal portion of the second outrigger arm, in which a part of the second damping member adheres to the load beam, and another part of the second damping member adheres to the second outrigger arm.

2. The disk drive suspension of claim 1, wherein the first outrigger vibration suppression portion comprises a first aperture portion including a first aperture formed in the load beam, a first load beam adhesion portion formed by causing a part of the first damping member to adhere to the second surface of the load beam, and a first outrigger adhesion portion formed by causing another part of the first damping member to adhere to the first outrigger root portion inside the first aperture, and the second outrigger vibration suppression portion comprises a second aperture portion including a second aperture formed in the load beam, a second load beam adhesion portion formed by causing a part of the second damping member to adhere to the second surface of the load beam, and a second outrigger adhesion portion formed by causing another part of the second damping member to adhere to the second outrigger root portion inside the second aperture.

3. The disk drive suspension of claim 2, wherein the first outrigger vibration suppression portion comprises a first spacer provided between the first damping member and the first outrigger root portion inside the first aperture, and the second outrigger vibration suppression portion comprises a second spacer provided between the second damping member and the second outrigger root portion inside the second aperture.

4. The disk drive suspension of claim 2, wherein the first outrigger vibration suppression portion comprises the first damping member having a shape covering the first aperture, the first load beam adhesion portion present around the first aperture, and the first outrigger adhesion portion present inside the first aperture, and the second outrigger vibration suppression portion comprises the second damping member having a shape covering the second aperture, the second load beam adhesion portion present around the second aperture, and the second outrigger adhesion portion present inside the second aperture.

5. The disk drive suspension of claim 2, wherein the first outrigger vibration suppression portion comprises the first damping member having a rectangular shape extending in a length direction of the first aperture, the first load beam adhesion portion present in each end portion of the first damping member, and the first outrigger adhesion portion present inside the first aperture, and the second outrigger vibration suppression portion comprises the second damping member having a rectangular shape extending in a length direction of the second aperture, the second load beam adhesion portion present in each end portion of the second damping member, and the second outrigger adhesion portion present inside the second aperture.

6. The disk drive suspension of claim 2, wherein the first outrigger vibration suppression portion comprises the first damping member having a cruciform shape including a vertical portion extending in a length direction of the first aperture and a lateral portion extending in a width direction of the first aperture, and the second outrigger vibration suppression portion comprises the second damping member having a cruciform shape including a vertical portion extending in a length direction of the second aperture and a lateral portion extending in a width direction of the second aperture.

7. The disk drive suspension of claim 2, wherein the first outrigger vibration suppression portion comprises a first bending portion which is a part of the first outrigger arm in a length direction and inserted into the first aperture, and the first outrigger adhesion portion formed by causing the first bending portion to adhere to the first damping member inside the first aperture, and the second outrigger vibration suppression portion comprises a second bending portion which is a part of the second outrigger arm in a length direction and inserted into the second aperture, and the second outrigger adhesion portion formed by causing the second bending portion to adhere to the second damping member inside the second aperture.

8. The disk drive suspension of claim 1, wherein the first outrigger vibration suppression portion comprises the first damping member provided on the first surface of the load beam, a first load beam adhesion portion formed by causing a part of the first damping member to adhere to the first surface, and a first outrigger adhesion portion formed by causing another part of the first damping member to adhere to the first outrigger root portion, and the second outrigger vibration suppression portion comprises the second damping member provided on the first surface of the load beam, a second load beam adhesion portion formed by causing a part of the second damping member to adhere to the first surface, and a second outrigger adhesion portion formed by causing another part of the second damping member to adhere to the second outrigger root portion.

* * * * *